United States Patent
Epping

(10) Patent No.: US 12,493,073 B2
(45) Date of Patent: Dec. 9, 2025

(54) TEST ARRANGEMENT FOR TESTING A POWER ELECTRONICS CONTROLLER

(71) Applicant: dSPACE GmbH, Paderborn (DE)

(72) Inventor: Daniel Epping, Paderborn (DE)

(73) Assignee: dSPACE GMBH, Paderborn (DE)

(*) Notice: Subject to any disclaimer, the term of this patent is extended or adjusted under 35 U.S.C. 154(b) by 136 days.

(21) Appl. No.: 18/427,448

(22) Filed: Jan. 30, 2024

(65) Prior Publication Data

US 2024/0255566 A1    Aug. 1, 2024

(30) Foreign Application Priority Data

Jan. 31, 2023    (DE) .................... 10 2023 102 270.9

(51) Int. Cl.
*G01R 31/28* (2006.01)
*G01R 31/40* (2020.01)

(52) U.S. Cl.
CPC ..... *G01R 31/2848* (2013.01); *G01R 31/2837* (2013.01); *G01R 31/2839* (2013.01); *G01R 31/40* (2013.01)

(58) Field of Classification Search
USPC .................................................. 324/764.01
See application file for complete search history.

(56) References Cited

U.S. PATENT DOCUMENTS

| | | | |
|---|---|---|---|
| 8,754,663 B2 * | 6/2014 | Schulte | G05B 17/02 324/750.01 |
| 2023/0168313 A1 | 6/2023 | Bracker et al. | |

FOREIGN PATENT DOCUMENTS

| | | |
|---|---|---|
| CN | 106814638 A | 6/2017 |
| DE | 102021113004 B3 | 6/2022 |
| DE | 102022131865 A1 | 6/2023 |

* cited by examiner

*Primary Examiner* — Farhana A Hoque
(74) *Attorney, Agent, or Firm* — Muncy, Geissler, Olds & Lowe, P.C.

(57) ABSTRACT

A test arrangement for testing a power electronics controller, wherein the controller has supply connections and load connections. A plurality of power electronics modules each have supply connections, at least one load connection, and an interface for controlling the power electronics module. In an operational state of the test arrangement, the supply connections of the controller are each connected to the load connection of a supply-side power electronics module and the load connections of the controller are each connected to the load connection of a load-side power electronics module. Thus, a rapid supply-side current regulation can be realized in a simple way in that the control device calculates at least the determined actual currents at the load connections of the supply-side power electronics modules from determined electrical connection variables of the load connections of the load-side power electronics modules for use for the feed-forward control.

7 Claims, 5 Drawing Sheets

TEST ARRANGEMENT FOR TESTING A POWER ELECTRONICS CONTROLLER

This nonprofisional application claims priority under 35 U.S.C. § 119(a) to German Patent Application No. 10 2023 102 270.9, which was filed in Germany on Jan. 31, 2023, and which is herein incorporated by reference.

BACKGROUND OF THE INVENTION

Field of the Invention

The invention relates to a test arrangement for testing a power electronics controller, wherein the controller has supply connections for supplying energy and load connections for controlling an electrical load, with a plurality of power electronics modules, wherein each power electronics module has supply connections for supplying energy, at least one load connection for providing at least one electrical connection variable, and an interface for controlling the power electronics module, wherein, in the operational state of the test arrangement, the supply connections of the controller are each connected to the load connection of a supply-side power electronics module and the load connections of the controller are each connected to the load connection of a load-side power electronics module, and wherein the interfaces of the supply-side and load-side power electronics modules are at least indirectly supplied with control values by at least one control device, wherein the control device for setting setpoint currents at the load connections of the supply-side power electronics modules calculates the control values for the supply-side power electronics modules with the aid of a mathematical energy source model and using the determined actual currents at the load connections of the supply-side power electronics modules, and wherein the calculated control values are modified by a feedforward control using the determined actual currents at the load connections of the supply-side power electronics modules and the interfaces of the supply-side power electronics modules are supplied with the modified calculated control values.

Test arrangements of the aforementioned type are known from the conventional art and serve for testing power electronics controllers such as are used in different fields of technology, for example, in the automotive sector, in the aerospace sector, but also in industrial applications, such as, for example, process engineering applications. The power electronics controller is designed to control electrical loads, wherein the absolute level of electrical power to be controlled is not important. It is possible that only power levels of a few watts need to be handled, but it can also be the case that power levels in the range of a few 100 kW (or more) have to be controlled.

Description of the Background Art

A typical example of a power electronics controller in the automotive sector is a motor controller for an electric motor. In a real application, therefore, not in the test with the test arrangement, the motor controller is usually supplied via its supply connections via a DC source, and the load connections of the motor controller are connected to the corresponding supply connections of the motor. The DC voltage source is, for example, a battery. Depending on whether the connected electric motor is operated by a motor or a generator, the energy flow through the power electronics controller can run from its supply connections to the load connections, but also vice versa from the load connections to the supply connections.

In the test arrangement considered here, the environment of the controller to be tested is simulated power-electronically with the test arrangement; therefore, no actual motor is connected to the load connections of the power electronics controller, but rather corresponding load-side power electronics modules; the application is called a hardware-in-the-loop simulation (HIL simulation). Corresponding supply-side power electronics modules are also connected to the supply connections of the power electronics controller. With the power electronics modules, it is possible to simulate both electrical energy sources and electrical energy sinks. For this purpose, the power electronics module can be controlled via an interface in such a way that a specific electrical connection variable is set at its load connection, therefore, a specific voltage or a specific current.

It follows from the foregoing that the claimed test arrangement does not comprise the power electronics controller itself that is to be tested. However, the nature of the power electronics controller to be tested must be described, because otherwise the interaction with the claimed test arrangement cannot be understood. If, when the test arrangement is in the operational state, the supply connections and the load connections of the controller are each connected to the load connection of a supply-side or load-side power electronics module for providing an electrical connection variable at the supply connections and the load connections of the controller, then this clearly means that, in order to produce the operational state of the test arrangement, a connection must be made of the power electronics modules included in the test arrangement to the corresponding connections of the power electronics controller not included in the test arrangement but to be tested; the load connections of the power electronics modules can therefore be connected to the supply connections and to the load connections of the controller that is to be tested.

The manner in which a power electronics module must be controlled via its interface, therefore, how it must be supplied with control values, so that the desired electrical connection variable is set at its load connection, is determined on the supply side by calculating the aforementioned mathematical energy source model using the determined actual currents at the load connections of the supply-side power electronics modules. In the prior art, these determined actual currents (which are also the currents in and out of the supply connections of the controller during operation of the test arrangement) are obtained by measurement. The technical measurement of the determined actual currents is associated with a certain technical complexity and therefore also with corresponding costs. However, the technical measurement also has an unavoidable influence on the associated signal processing, for example, in the form of latencies occurring during the determination of measured values (sampling, A/D conversion). A further problem is that the measurement of the determined actual currents requires special measures, because the variables to be acquired are heavily disturbed, which is related to the fact that the power electronics modules usually comprise inverters with fast-switching half bridges. The rapidly changing switching signals naturally have high-frequency harmonic components and therefore often have to be extensively filtered in order to be usable, which leads to further latencies in signal processing and therefore also in current regulation.

In abstract terms, the power electronics controller to be tested is an n-pole, wherein the sum of the currents flowing into and out of its connections must necessarily be zero, because the controller is source- and sink-free. The sum of the supply-side currents and the load-side currents must also be zero as a rule. These conditions must also be fulfilled very precisely by the test arrangement when testing the controller. It is also evident from this approach that it must be possible to regulate quickly and precisely a rapid regulation of the supply-side and load-side currents of the controller to be tested or at the load connections of the power electronics modules provided there.

In order to be able to influence the control values for the supply-side power electronics modules more quickly without having to go via the detour of the energy source model, a feedforward control is realized in the prior art, in which the determined actual currents at the load connections of the supply-side power electronics modules are used directly to influence the control values for the supply-side power electronics modules, which values are calculated on the basis of the energy source model. The feedforward control therefore bypasses the controller within the energy source model, as is generally typical for feedforward controls. This improves the control behavior, just as the dynamics of the current control. However, this does not affect the effects associated with the technical measurement of the determined actual currents (effort, latencies).

SUMMARY OF THE INVENTION

It is therefore an object of the present invention to further develop the previously described test arrangement for testing a power electronics controller so that the currents at the load connections of the supply-side power electronics modules can be regulated more quickly and easily.

The object derived above is achieved with the aforementioned test arrangement in that the control device calculates at least the determined actual currents at the load connections of the supply-side power electronics modules for use for the feedforward control from the determined electrical connection variables of the load connections of the load-side power electronics modules. The electrical connection variables of the load connections of the load-side power electronics modules are at the same time the electrical connection variables of the load connections of the power electronics controller to be tested. The invention makes use of the fact that the controller to be tested is an n-pole with a current sum of zero at its connections. The condition for a current sum of zero therefore naturally also applies to the supply-side power electronics modules, which are connected to the corresponding supply connections and load connections of the controller. In addition to a current sum of zero, there are further electrotechnical relationships that can be used in the context of the invention. This is, for example, the fact that the supply-side power and the load-side power at the controller depend on each other, namely, are substantially identical, except for the energy consumed by the controller itself. In any case, the realization of the invention is that the determined electrical connection variables of the load connections of the load-side power electronics modules are suitable for calculating the determined actual currents at the load connections of the supply-side power electronics modules and then using these actual currents determined by calculation for the feedforward control, therefore, to modify the control values, calculated using the energy source model, with the determined actual currents.

As a result, for example, there is no need for the technical measurement of the determined actual currents at the load connections of the supply-side power electronics modules.

In addition, by calculating the determined actual currents at the load connections of the supply-side power electronics modules from the determined electrical connection variables of the load connections of the load-side power electronics modules, the latencies caused by a measurement process can be avoided, which increases the dynamics of the supply-side current regulation.

The control device can calculate the load-side active electrical power from the determined electrical connection variables of the load connections of the load-side power electronics modules and calculates the determined actual currents at the load connections of the supply-side power electronics modules from the load-side active electrical power. If the voltages and currents of the load connections of the load-side power electronics modules are known, the active power on the load side can be calculated, namely, using voltage-current products. The calculation of active power is known per se, even in the case of non-harmonic current and/or voltage curves. If the active power is then divided by the voltage between the load connections of the supply-side power electronics modules, the values for the currents at the load connections of the supply-side power electronics modules follow directly by calculation.

The control device can calculate a mathematical load model of a load to be simulated by the load-side power electronics modules, determines information about the mechanical power of the simulated load from the load model, and calculates the load-side active electrical power from the mechanical power of the simulated load using the efficiency of the controller. As in the previous case, the determined actual currents at the load connections of the supply-side power electronics modules can be calculated from the load-side active electrical power. This mathematical determination of the determined actual currents at the load connections of the supply-side power electronics modules has the same advantages as the aforementioned calculation from the determined electrical connection variables of the load connections of the load-side power electronics modules. Here as well, it is preferably provided that the control device uses a measured voltage between the load connections of the supply-side power electronics modules to calculate the determined actual currents at the load connections of the supply-side power electronics modules from the calculated load-side active electrical power.

The control device can use a voltage between the load connections of the supply-side power electronics modules, which voltage is calculated using the energy source model, to calculate the determined actual currents at the load connections of the supply-side power electronics modules from the calculated load-side active electrical power. This could also replace the technical measurement of the voltage between the load connections of the supply-side power electronics modules. For this purpose, it is preferably provided that the energy source model receives the information about the electrical connection variables of the load-side power electronics modules that the load-side load model also receives.

The control device can calculate both the determined actual currents at the load connections of the supply-side power electronics modules for calculating the control values for the supply-side power electronics modules using the energy source model and the determined actual currents at the load connections of the supply-side power electronics modules for use with the feedforward control for modifying the control values, calculated using the energy source model, from the determined electrical connection variables of the load connections of the load-side power electronics modules. If the determined actual currents are used on both sides without measurement, the technical measurement of the determined actual currents can be completely omitted. At the same time and inherently, this procedure is latency-free or only associated with minimal latencies in signal processing. This makes it possible overall to calculate the supply-side calculation of control variables using the energy source model and the load-side calculation of control variables using the load model on a mutual time basis, because it was simultaneously determined, and corresponding control values can be output and used synchronously on the supply and load sides. This considerably increases the possibility of regulating the total current at the controller to be tested to zero.

The determined actual currents at the load connections of the supply-side power electronics modules can be measured to calculate the control values for the supply-side power electronics modules using the energy source model. This is suitable for test arrangements that are already set up in such a way that they in any case already measure the determined actual currents at the load connections of the supply-side power electronics modules and use the calculation of the control values for the supply-side power electronics modules using the energy source model for them. Here, however, an improvement in the dynamic behavior of the supply-side current regulation can be achieved solely in that the determined actual currents used in the feedforward control according to the invention are determined by calculation from the determined electrical connection variables of the load connections of the load-side power electronics modules. There are therefore actual currents determined in two ways, on the one hand, by measurement and, on the other, by calculation.

In particular, there are now a plurality of options for configuring and developing further the test arrangement of the invention. To this end, reference is made, on the one hand, to the claims subordinate to the independent claim and, on the other, to the following description of exemplary embodiments in conjunction with the drawing.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
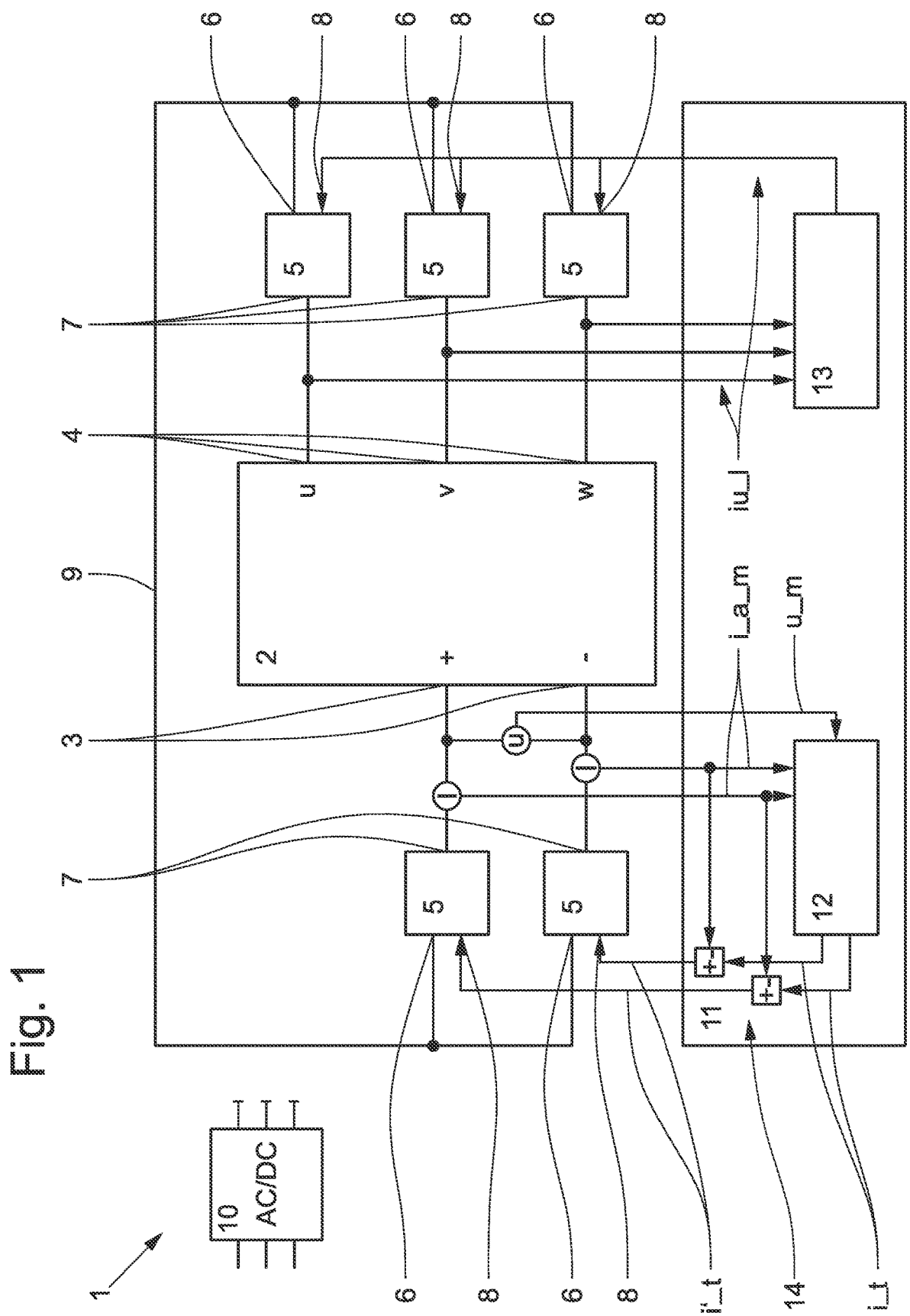
FIG. 1 schematically shows a conventional test arrangement, with feedforward control of the supply-side power electronics modules using actual currents, determined by measurement on the supply side, at the load connections of the supply-side power electronics modules.

FIGS. 1 to 5 each show a test arrangement 1 for testing a power electronics controller 2. Controller 2 is not part of test arrangement 1, but test arrangement 1 can only be described meaningfully if the use of test arrangement 1 is explained in connection with a power electronics controller 2.

Controller 2 has supply connections 3 for supplying energy and load connections 4 for controlling an electrical load. In real use of power electronics controller 2, therefore, the use of controller 2 not in connection with test arrangement 1, supply connections 3 would be connected, for example, to a battery 3, and load connections 4 would be connected, for example, to the connections of an electric drive, for example, an asynchronous motor. In the examples shown, test arrangement 1 replaces this environment of power electronics controller 2 in order to simulate a real working environment for controller 2. The illustrated example therefore show hardware-in-the-loop test scenarios.

Each power electronics module 5 has supply connections 6 for supplying energy, at least one load connection 7 for providing at least one electrical connection variable, and an interface 8 for controlling power electronics module 5.

In the operational state of test arrangement 1, therefore, with power electronics controller 2 in place, as shown in the figures, power electronics modules 5 take the place of the "real" energy source (for example, a battery) and the "real" load (for example, an asynchronous motor). In the operational state of test arrangement 1, supply connections 3 of controller 2 are therefore each connected to load connection 7 of a supply-side power electronics module 5 to provide a desired electrical connection variable at supply connections 3 of controller 2. Similarly, in the operational state of test arrangement 1, load connections 4 of controller 2 are each connected to load connection 7 of a load-side power electronics module 5 to provide a connection variable at load connections 4 of controller 2.

In the examples, supply connections 6 of supply-side power electronics modules 5 and supply connections 6 of load-side power electronics modules 5 are connected to each other via an electrical intermediate network 9; therefore, they are galvanically connected to each other. This example of the test arrangement 1 has the advantage that electrical energy can be exchanged between the supply-side and load-side power electronics modules 5 via electrical intermediate network 9, so that only the energy consumed for the pure operation of test arrangement 1 and controller 2 has to be supplied from the outside, therefore, via the indicated external energy supply 10, but the electrical energy that would be consumed by the electrical load in the real application does not have to be constantly fed into test arrangement 1 from the outside. However, electrical intermediate network 9 is not important here; the examples would be just as conceivable without intermediate network 9.

Interfaces 8 of the supply-side and load-side power electronics modules 5 are supplied at least indirectly with control values by at least one control device 11, wherein control device 11 for setting setpoint currents at load connections 7 of the supply-side power electronics modules 5 calculates the control values $i\_t$ for supply-side power electronics modules 5 with the aid of a mathematical energy source model 12 and using determined actual currents $i\_a$ at load connections 7 of supply-side power electronics modules 5. The calculated control values $i\_t$ are modified by a feedforward control 14 using the determined actual currents $i\_a$ at load connections 7 of supply-side power electronics modules 5. This measure serves to improve the control behavior and the dynamics of the supply-side current regulation. The modified calculated control values $i'\_t$ are applied to interfaces 8 of supply-side power electronics modules 5. Because feedforward control 14 is important in the context of the present invention, it is made clear on the supply side in the figures that each supply-side power electronics module 5 is separately supplied with the modified calculated control values $i'\_t$ at its interface 8. This distinction has not been made graphically on the load side in order to maintain a better overview; the load-side power electronics modules 5 are therefore usually supplied with a separate specification for the current to be set. Each of the three load-side power electronics modules 5 can therefore be controlled separately via the one signal line shown between mathematical load model 13 and interfaces 8 of the three load-side power electronics modules 5.

The example shown in FIG. 1 works with actual currents $i\_a$ determined by measurement at load connections 7 of supply-side power electronics modules 5, which are therefore labeled $i\_a\_m$ in FIG. 1. The measurement of the determined actual currents $i\_a$ ($i\_a\_m$) is associated with technical complexity and is always accompanied by signal delays (sampling, filtering), which have a negative effect on the speed of the current regulation.

The example according to FIGS. 2 to 5 have in common that control device 11 calculates at least the determined actual currents $i\_a$ at load connections 7 of load-side power electronics modules 5 for use for feedforward control 14 from the determined electrical connection variables $iu\_l$ of load connections 7 of load-side power electronics modules 5. In the example, the determined electrical connection variables $iu\_l$ of load connections 7 of load-side power electronics modules 5 are measured voltages at load connections 7 of load-side power electronics modules 5 and predetermined currents for load-side power electronics modules 5. Other constellations are also conceivable, for example, measured voltages between load connections 7 or measured currents through load-side power electronics modules 5. This measure can eliminate the technical measurement of the determined actual currents $i\_a$ at load connections 7 of supply-side power electronics modules 5. This also avoids the latencies caused by a measuring process, which increases the dynamics of the supply-side current regulation.

Figure 2:
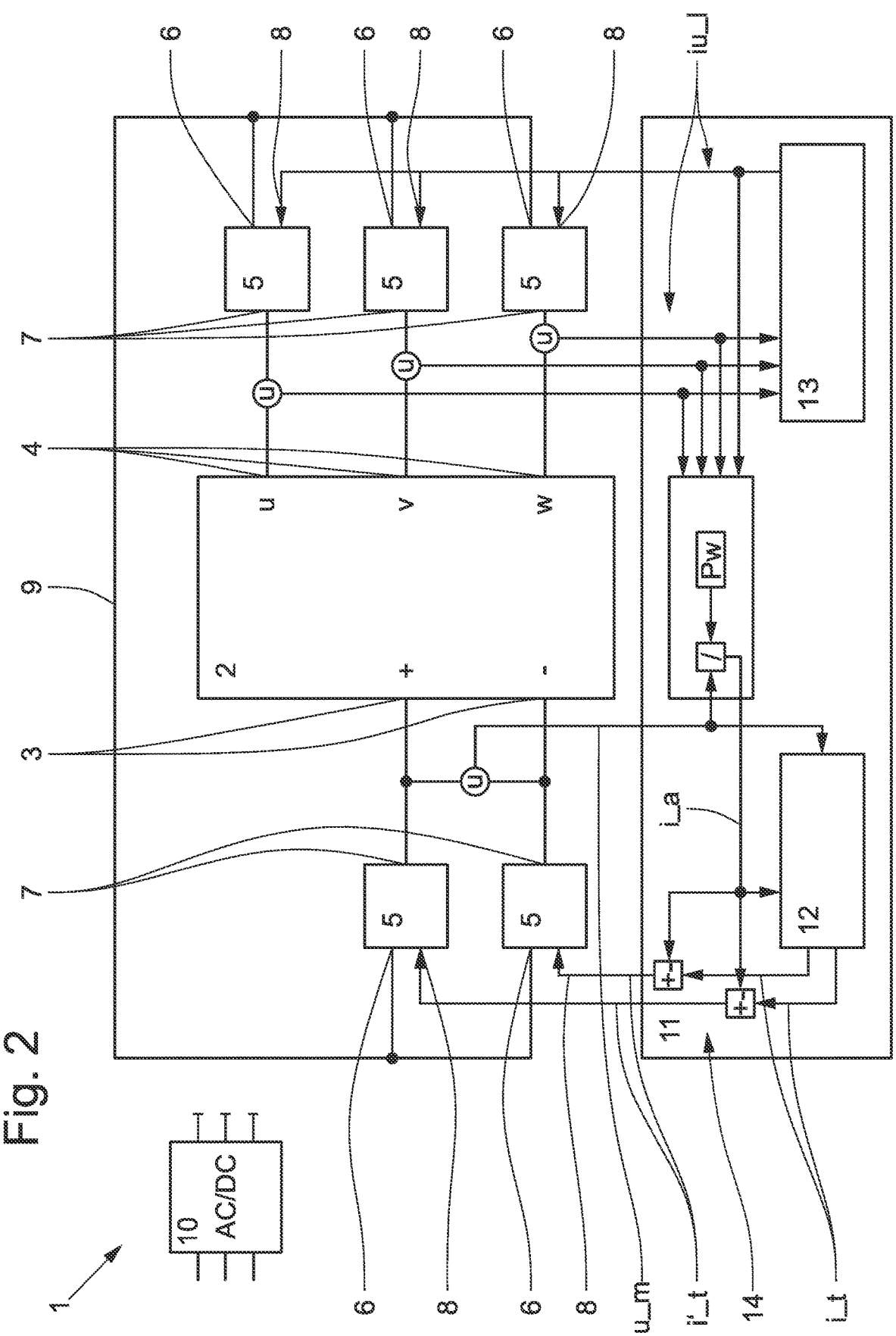
FIG. 2 schematically shows an example of the test arrangement with feedforward control, in which the determined actual currents at the load connections of the supply-side power electronics modules are calculated from determined electrical connection variables of the load connections of the load-side power electronics modules, namely, using the load-side active electrical power.

In the test arrangement 1 according to FIG. 2, control device 11 calculates the load-side active electrical power Pw from the determined electrical connection variables $iu\_l$ of load connections 7 of load-side power electronics modules 5. The determined actual currents $i\_a$ at load connections 7 of supply-side power electronics modules 5 are calculated from the load-side active electrical power Pw and used for feedforward control 14.

Figure 3:
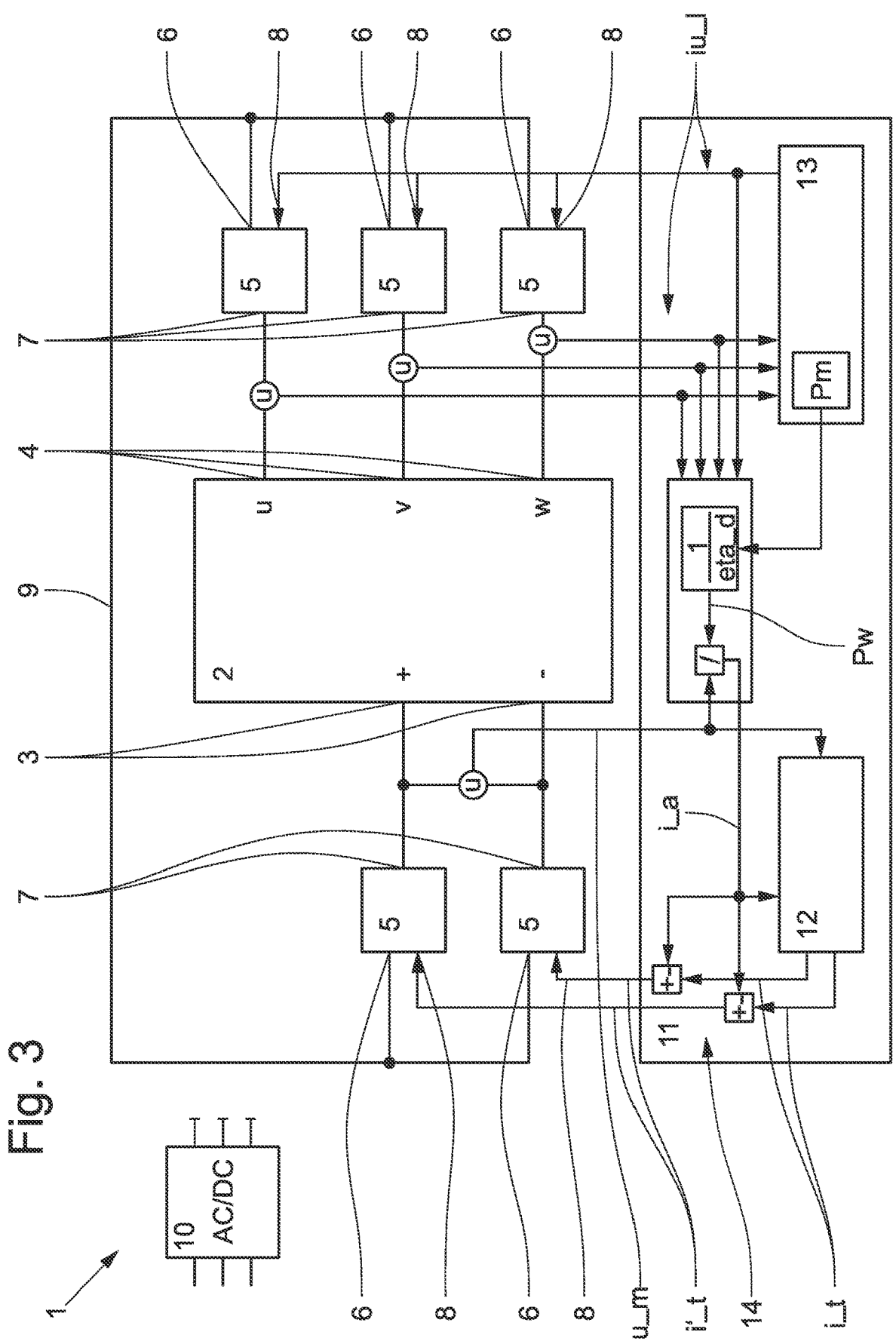
FIG. 3 schematically shows an example of the test arrangement with feedforward control, in which the determined actual currents at the load connections of the supply-side power electronics modules are calculated from determined electrical connection variables of the load connections of the load-side power electronics modules, namely, using the mechanical power of the simulated load, said power being calculated in the load model.

Test arrangement 1 according to FIG. 3 is characterized in that control device 11 calculates a mathematical load model 13 of a load to be simulated by load-side power electronics modules 5 and determines information about the mechanical power Pm of the load to be simulated from load model 13. The load-side active electrical power Pw is then calculated from the mechanical power Pm of the load to be simulated and from the information about the efficiency $eta\_d$ of controller 2. Control device 11 calculates the determined actual currents $i\_a$ at load connections 7 of supply-side power electronics modules 5 from the load-side active electrical power Pw. This variant is advantageous because many load models 13 calculate the instantaneous load-side mechanical power Pm anyway, so that the information exists and is available without additional effort.

Figure 5:
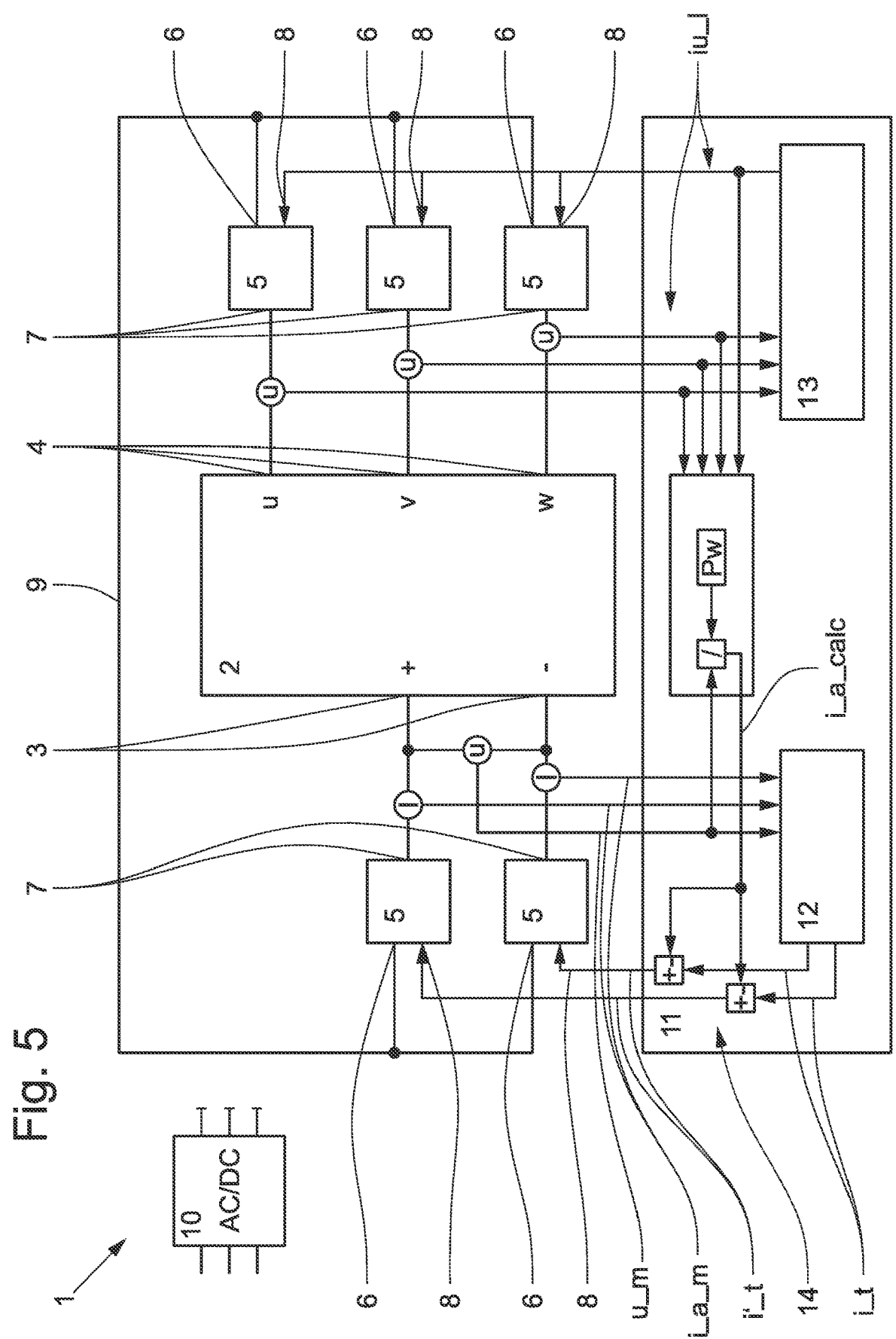
FIG. 5 schematically shows an example of the test arrangement with feedforward control, in which the determined actual currents at the load connections of the supply-side power electronics modules are calculated from determined electrical connection variables of the load connections of the load-side power electronics modules, wherein measured currents are also used in the load connections of the supply-side power electronics modules.

In the test arrangements 1 according to FIGS. 2, 3, and 5, control device 11 additionally uses a measured voltage $u\_m$ between load connections 7 of supply-side power electronics modules 5 to calculate the determined actual currents $i\_a$ at load connections 7 of supply-side power electronics modules 5 from the calculated load-side active electrical power Pw. This makes sense because the active electrical power is always calculated using voltages and currents as connection variables.

Figure 4:
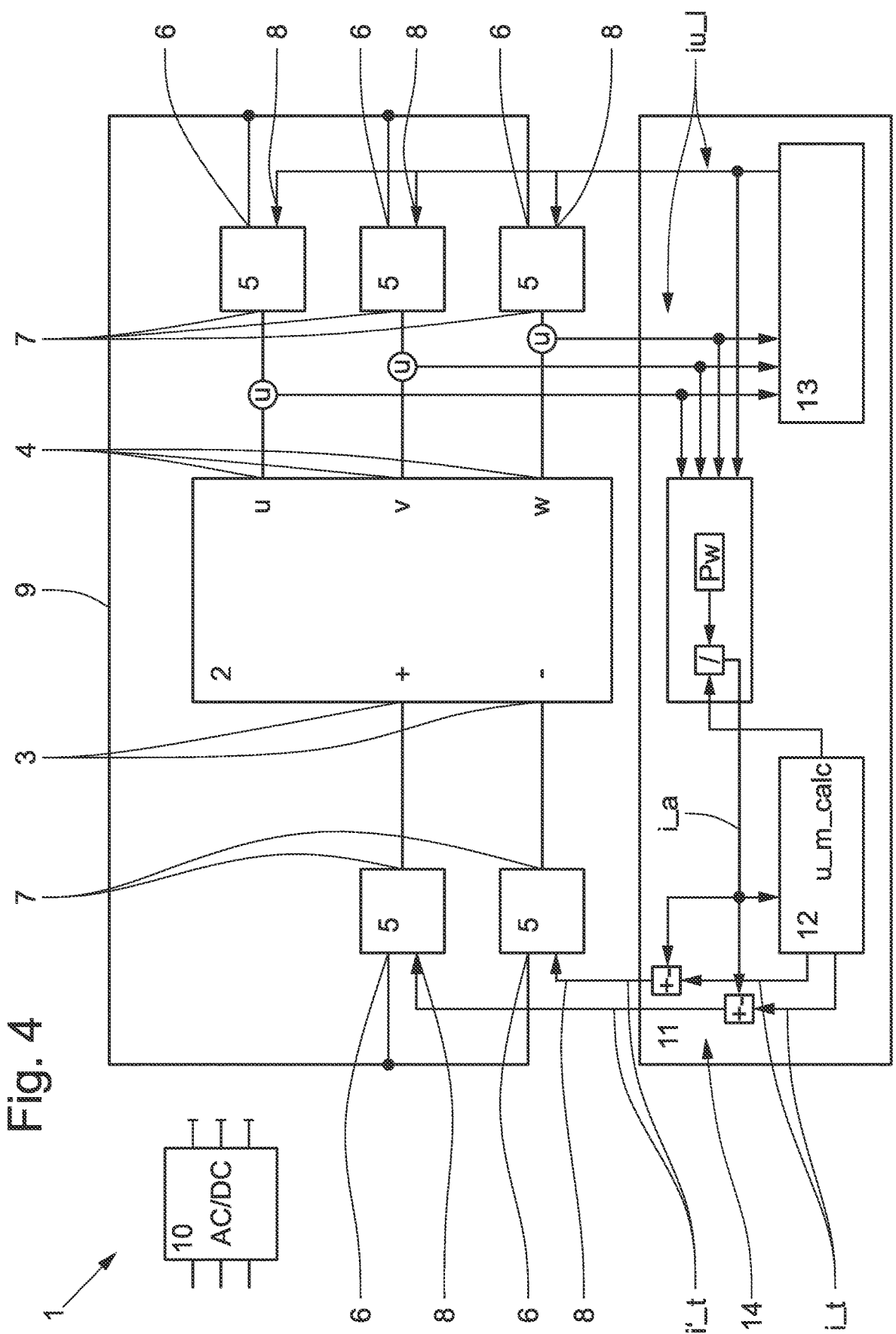
FIG. 4 schematically shows an example of the test arrangement with feedforward control, in which the determined actual currents at the load connections of the supply-side power electronics modules are calculated from determined electrical connection variables of the load connections of the load-side power electronics modules and from the calculated voltage between the load connections of the supply-side power electronics modules.

The test arrangement 1 according to FIG. 4 takes a slightly different approach; here control device 11 additionally uses a voltage $u\_m\_calc$, calculated using energy source model 12, between load connections 7 of supply-side power electronics modules 5 to calculate the determined actual currents $i\_a$ at load connections 7 of supply-side power electronics modules 5 from the calculated load-side active electrical power Pw. In an example, the determined electrical connection variables $iu\_l$ of load connections 7 of load-side power electronics modules 5 in particular are also used to calculate the voltage $u\_m\_calc$.

In the test arrangements 1 according to FIGS. 2 to 4, control device 11 calculates the determined actual currents $i\_a$ at load connections 7 of supply-side power electronics modules 5 to calculate the control values $i\_t$ for supply-side power electronics modules 5 using energy source model 12. Control device 11 also calculates the determined actual currents $i\_a$ at load connections 7 of supply-side power electronics modules 5 for use with feedforward control 14, therefore, for modifying the control values $i\_t$, calculated using energy source model 12, to the modified control values $i'\_t$. In both cases, the calculation occurs using the determined electrical connection variables $iu\_l$ of load connections 7 of load-side power electronics modules 5. This procedure is low-latency in principle, because otherwise the delays caused by a measurement are eliminated.

The test arrangement 1 according to FIG. 5 has the special feature that the determined actual currents $i\_a$ at load connections 7 of supply-side power electronics modules 5 are determined by measurement using energy source model 12 to calculate the control values $i\_t$ for supply-side power electronics modules 5, which is why they are labeled with i_a_m in FIG. 5. This approach has been taken here because test arrangement 1 was already set up so that it measures the determined actual currents i_a at load connections 7 of supply-side power electronics modules 5 and uses the calculation of the control values i_t for supply-side power electronics modules 5 using energy source model 12 for them. Nevertheless, an improvement in the dynamic behavior of the supply-side current regulation can be achieved by determining the actual currents i_a (denoted with i_a_calc in FIG. 5 to distinguish them from i_a_m) used in feedforward control 14 by calculation from the determined electrical connection variables iu_l of load connections 7 of load-side power electronics modules 5.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A test arrangement to test a power electronics controller, the controller having supply connections to supply energy and load connections to control an electrical load, the test arrangement comprising:
   at least two power electronics modules, each of the at least two power electronics module comprising:
   a supply connection to supply energy;
   at least one load connection to provide at least one electrical connection variable; and
   at least one interface to control the power electronics module,
   wherein, in an operational state of the test arrangement, the supply connections of the controller are each connected to the load connection of a supply-side power electronics module and the load connections of the controller are each connected to the load connection of a load-side power electronics module,
   wherein the interface of the supply-side and the interface of the load-side power electronics modules are at least indirectly supplied with control values by at least one control device,
   wherein the control device for setting setpoint currents at the load connections of the supply-side power electronics modules calculates the control values for the supply-side power electronics modules via a mathematical energy source model and using the determined actual currents at the load connections of the supply-side power electronics modules,
   wherein the calculated control values are modified by a feedforward control using the determined actual currents at the load connections of the supply-side power electronics modules and the interfaces of the supply-side power electronics modules are supplied with the modified calculated control values, and
   wherein the control device calculates at least the determined actual currents at the load connections of the supply-side power electronics modules for the feedforward control from the determined electrical connection variables of the load connections of the load-side power electronics modules.

2. The test arrangement according to claim 1, wherein the control device calculates the load-side active electrical power from the determined electrical connection variables of the load connections of the load-side power electronics modules and calculates the determined actual currents at the load connections of the supply-side power electronics modules from the load-side active electrical power.

3. The test arrangement according to claim 1, wherein the control device calculates a mathematical load model of a load to be simulated by the load-side power electronics modules, determines information about the mechanical power of the load to be simulated from the load model, and calculates the load-side active electrical power from the mechanical power of the load to be simulated and information about the efficiency of the controller, and calculates the determined actual currents at the load connections of the supply-side power electronics modules from the load-side active electrical power.

4. The test arrangement according to claim 2, wherein the control device uses a measured voltage between the load connections of the supply-side power electronics modules to calculate the determined actual currents at the load connections of the supply-side power electronics modules from the calculated load-side active electrical power.

5. The test arrangement according to claim 2, wherein the control device uses a voltage, calculated using the energy source model, between the load connections of the supply-side power electronics modules to calculate the determined actual currents at the load connections of the supply-side power electronics modules from the calculated load-side active electrical power.

6. The test arrangement according to claim 1, wherein the control device calculates both the determined actual currents at the load connections of the supply-side power electronics modules for calculating the control values for the supply-side power electronics modules using the energy source model and the determined actual currents at the load connections of the supply-side power electronics modules for use with the feedforward control for modifying the control values calculated using the energy source model from the determined electrical connection variables of the load connections of the load-side power electronics modules.

7. The test arrangement according to claim 1, wherein the determined actual currents at the load connections of the supply-side power electronics modules are measured to calculate the control values for the supply-side power electronics modules using the energy source model.

* * * * *